(12) United States Patent
An et al.

(10) Patent No.: US 11,358,133 B2
(45) Date of Patent: Jun. 14, 2022

(54) METAL ION-DIRECTED CARBOXYLIC ACID FUNCTIONALIZED POLYOXOMETALATE HYBRID COMPOUNDS AND THEIR PREPARATION METHOD AND APPLICATIONS FOR CATALYZING THE DEGRADATION OF CHEMICAL WARFARE AGENT SIMULANTS

(71) Applicant: Dalian University of Technology, Dalian (CN)

(72) Inventors: Haiyan An, Dalian (CN); Yujiao Hou, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 601 days.

(21) Appl. No.: 16/476,012

(22) PCT Filed: May 16, 2018

(86) PCT No.: PCT/CN2018/087127
§ 371 (c)(1),
(2) Date: Jul. 3, 2019

(87) PCT Pub. No.: WO2019/218275
PCT Pub. Date: Nov. 21, 2019

(65) Prior Publication Data
US 2020/0254430 A1 Aug. 13, 2020

(51) Int. Cl.
*B01J 31/22* (2006.01)
*A62D 3/35* (2007.01)
*A62D 3/38* (2007.01)

(52) U.S. Cl.
CPC ............ *B01J 31/2217* (2013.01); *A62D 3/35* (2013.01); *A62D 3/38* (2013.01);
(Continued)

(58) Field of Classification Search
None
See application file for complete search history.

(56) References Cited

FOREIGN PATENT DOCUMENTS

CN 106876759 A 6/2017
CN 107188241 A 9/2017
(Continued)

OTHER PUBLICATIONS

Kortz et al. (Angew. Chem. Int. Ed., 41(21), 4070-4073 (Year: 2002).*

*Primary Examiner* — Yun Qian
(74) *Attorney, Agent, or Firm* — Muncy, Geissler, Olds & Lowe, P.C.

(57) ABSTRACT

Metal ion-directed carboxylic acid functionalized polyoxometalate hybrid compounds, and their preparation method and applications in catalyzing the degradation of chemical warfare agent simulants. In the synthesis, $Na_2MoO_4$, p-hydroxybenzonic acid (PHBA), alanine (Ala), KCl, transition metal cations and $As_2O_3$ as raw materials and water are used as solvent. At room temperature, 2-chloroethyl ethyl sulfide (CEES) and the prepared polyoxometalate hybrid compounds were mixed together in anhydrous ethanol and stirred, and $H_2O_2$ was subsequently added into the reaction system. The catalytic reaction for the degradation of CEES was finished within 5 min under stirring. In the catalytic hydrolysis of diethyl cyanophosphonate (DECP), the catalyst, DECP, DMF and $H_2O$ were put together and mixed fully. The prepared polyoxometalate hybrid compounds have the advantages of high conversion, high selectivity and easy recyclability in catalyzing the degradation of two types of chemical warfare agent simulant.

6 Claims, 7 Drawing Sheets

(52) U.S. Cl.
CPC .... *B01J 2531/0222* (2013.01); *B01J 2531/26* (2013.01); *B01J 2531/72* (2013.01); *B01J 2531/845* (2013.01); *B01J 2531/847* (2013.01)

(56) References Cited

FOREIGN PATENT DOCUMENTS

| | | |
|---|---|---|
| CN | 107626201 A | 1/2018 |
| CN | 108559100 A | 9/2018 |
| WO | WO2009/139939 A2 | 11/2009 |

* cited by examiner

METAL ION-DIRECTED CARBOXYLIC ACID FUNCTIONALIZED POLYOXOMETALATE HYBRID COMPOUNDS AND THEIR PREPARATION METHOD AND APPLICATIONS FOR CATALYZING THE DEGRADATION OF CHEMICAL WARFARE AGENT SIMULANTS

TECHNICAL FIELD

This invention belongs to the technical field of catalytic chemistry, particularly relates to one kind of hybrid compounds composed of carboxylic acid ligands functionalized polyoxometalates and metal cations and their preparation method and applications for catalyzing the oxidation degradation of sulfur mustard simulant 2-chloroethyl ethyl sulfide and the hydrolysis degradation of nerve agent simulant diethyl cyanophosphonate.

BACKGROUND

Chemical warfare agents (CWAs) have caused mass casualties from World War I to the attacks of chemical weapons in Syria in recent years. Vesicant agents and nerve agents are two types of widely used and toxic chemical warfare agents. Vesicant agents can cause severe blisters on the skin, eyes and respiratory tract, damage to the structures of DNA and in large doses even lead to death. As the most typical vesicant agent, sulfur mustard (bis (2-chloroethyl) sulfide) is mainly degraded through hydrolysis and oxidation. The hydrolysis usually is not complete owing to the immiscibility of sulfur mustard in water. The selective oxidation degradation of sulfur mustard to sulfoxide, no toxic over oxidation product, 2-chloroethyl ethyl sulfone, is a more promising route. Nerve agents can cause a range of incapacitation by disturbing signal transmission in the nervous system, the representative agent of which is organophosphonate. Organophosphate can be decomposed by hydrolysis through destroying P-X bonds. Owing to the high danger involved in managing with real CWAs, simulant molecules, 2-chloroethyl ethyl sulfide (CEES) and diethyl cyanophosphonate (DECP), are always used to investigate the degradation reaction by experimenters. Some solid materials including metal-organic frameworks and modified activated carbons have been reported to show considerable ability of degrading CWAs in the literatures. However, most of the reported materials only can destruct one kind of CWAs as monofunctional catalyst either by oxidation or by hydrolysis. Given the possibility of using various CWAs and the difficulty to predict what kind of CWAs will be used, therefore, it is an urgent issue to design and synthesize multifunctional catalysts that could degrade both sulfur mustard by oxidation and nerve agents via hydrolysis.

Polyoxometalates (POMs) are a kind of important inorganic metal oxide clusters with abundant molecular structures, electronic structures and charming topology properties, and have extensive applications in catalysis and material science. Hill's group has reported that the Fe-containing polyoxotungstates and $[PV_2Mo_{10}O_{40}]^{5-}$ can catalyze the oxidation of the sulfur mustard simulant CEES. Then, polyoxoniobates $[Nb_6O_{19}]^{8-}$ and $K_{12}[Ti_2O_2]$ $[GeNb_{12}O_{40}]\cdot 19H_2O$ were used to catalytically detoxify nerve agent simulants by hydrolysis (Guo. W. W.; Lv. H. J.; Sullivan. K. P.; Gordon. W. O.; Balboa A.; Wagner. G. W.; Musaev. D. G.; Bacsa. J.; Hill. C. L. Angew. Chem. Int. Ed.2016, 55, 7403-7407). Recently, a homogeneous polyoxometalate catalyst $H_{13}[(CH_3)_4N]_{12}[PNb_{12}O_{40}(VO)_2(V_4O_{12})_2]\cdot 22H_2O$ and a gel material composed of polyoxovanadate TBA-polyV$_6$ have been reported to degrade sulfur mustard simulants by oxidation and nerve agent simulants via hydrolysis (Dong. J.; Hu. J. F.; Chi. Y N.; Lin. Z. G.; Zou. B.; Yang. S.; Hill. C. L.; Hu. C. W. Angew. Chem. Int. Ed. 2017, 56, 4473-4477; Sullivan. K. P.; Neiwert. W. A.; Zeng. H. D.; Mehta. A. K.; Yin. Q. S.; Hillesheim. D. A.; Vivek. S.; Yin. P. C.; Collins-Wildman. D. L. Chem. Commun. 2017, 53, 11480-11483). In this regard, the above reported polyoxometalate-based catalysts have some problems, such as low degradation efficiency, low selectivity, and poor recyclability. Therefore, the search for more efficient multifunctional catalysts based on polyoxometalates that can rapidly and high-selectively destroy two types of CWAs still is highly desired.

SUMMARY OF THE INVENTION

The present invention is aimed to obtain one kind of catalysts based on carboxylic acid ligands functionalized polyoxometalates and metal cations. These catalysts can rapidly and high-selectively detoxify sulfur mustard simulant CEES by oxidation and the nerve agent simulant DECP via hydrolysis. And these catalysts can be reused.

Technical Solution of the Invention

One kind of metal ion-directed carboxylic acid functionalized polyoxometalates, show 1D chain-like structures through carboxylic acid functionalized polyoxometalate $[AsMo_6O_{21}(Ala)(PHBA)_2]^{5-}$ covalently joint by metal cations ($Co^{2+}$, $Ni^{2+}$, $Zn^{2+}$, or $Mn^{2+}$) The chemical formulas are $K_2H[(H_2O)_4M][AsMo_6O_{21}(Ala)(PHBA)_2]\cdot nH_2O$, wherein M=$Co^{2+}$1, $Ni^{2+}$2, $Zn^{2+}$3, $Mn^{2+}$4; Ala=alanine, PHBA=p-hydroxybenzonic acid, n=6.5, 9, 7.5, 7.5, the value of n corresponds to M=$Co^{2+}$, $Ni^{2+}$, $Zn^{2+}$, $Mn^{2+}$.

The described metal ion-directed carboxylic acid functionalized poloxometalates belong to the triclinic crystal system, and P-1 space group;

When M=$Co^{2+}$, the cell parameters of compound 1 are a=12.0872(8) Å, b=12.5682(8) Å, c=17.2255(13) Å, α=76.700(4)°, β=74.058(4)°, γ=76.399(4)°;

When M=$Ni^{2+}$, the cell parameters of compound 2 are a=11.9612(4) Å, b=12.5318(3) Å, c=17.1943(4) Å, α=76.4990(10)°, β=74.053(2)°, γ=76.535(2)°;

When M=$Zn^{2+}$, the cell parameters of compound 3 are a=12.1425(2) Å, b=12.5739(2) Å, c=17.2226(3) Å, α=76.4430(10)°, β=74.0620(10)°, γ=76.2250(10)°;

When M=$Mn^{2+}$, the cell parameters of compound 4 are a=12.2865(7) Å, b=12.6065(7) Å, c=17.2145(11) Å, α=76.319(3)°, β=73.933(3)°, γ=76.064(3)°;

Compounds 1-4 are isostructural, and the asymmetric unit of compounds 1-4 contains one crystallographically independent $[AsMo_6O_{21}]^{3-}$ anion, one $Co^{2+}$, $Ni^{2+}$, $Zn^{2+}$ or $Mn^{2+}$ cation, two $K^+$ cations, two p-hydroxybenzoic acids and one protonated alanine molecule. Firstly, the $[AsMo_6O_{21}(Ala)(PHBA)_2]^{5-}$ units are joined together by metal cations via Co/Ni/Zn/Mn—O—Mo bonds to produce a 1D linear chain. Then, a 2D supramolecular layer is formed by strong hydrogen bonds between 1D chains. Finally, these 2D layers are linked together to produce the 3D supramolecular framework via the hydrogen bonds.

The preparation method of the metal ion-directed carboxylic acid functionalized polyoxometalates is as follows:

$Na_2MoO_4$, PHBA, Ala, KCl and $As_2O_3$ were dissolved in water, and the pH value of the mixture was adjusted to 3.5-4.5 with 4 M HCl. Then, excessive $CoCl_2$ was added to the reaction system. The ratio of these materials Na$_2$MoO$_4$, PHBA, Ala, KClAs$_2$O$_3$ and CoCl$_2$ are 6:2:1:2-3:1:1-3. Finally, the solution was heated and stirred for 1-5 h in water bath at 75-100° C. The filtrate was kept undisturbed after it cooled under ambient conditions until the crystals produced. The crystals are the metal ion-directed carboxylic acid functionalized polyoxometalate hybrid compounds, which were then washed and dried.

The described CoCl$_2$ can be replaced by NiCl$_2$, ZnCl$_2$, or MnCl$_2$.

The described CoCl$_2$ can be replaced by Co(NO$_3$)$_2$ or CoSO$_4$.

One kind of metal ion-directed carboxylic acid functionalized polyoxometalate hybrid compounds catalyze the degradation of CEES and DECP. The operations are as follows:

The experimental condition for the degradation of CEES: CEES and the metal ion-directed carboxylic acid functionalized polyoxometalate hybrid compounds were mixed together in anhydrous ethanol, and oxidant H$_2$O$_2$ was subsequently added to this reaction system under stirring. The catalytic reaction was finished after 5 minutes. The ratio of CEES, the metal ion-directed carboxylic acid functionalized polyoxometalate hybrid compounds and oxidant is 200:3:200-300. The catalytic degradation route is as follow:

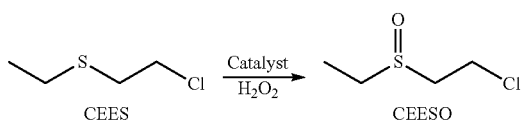

The experimental condition for the degradation of DECP: DECP, DMF and H$_2$O were mixed together under stirring, and then the metal ion-directed carboxylic acid functionalized polyoxometalate hybrid compounds were subsequently added to the catalytic system. The catalytic reaction was completed after 10 minutes. The ratio of DECP and catalyst is 1000:1. The catalytic degradation route is as follow:

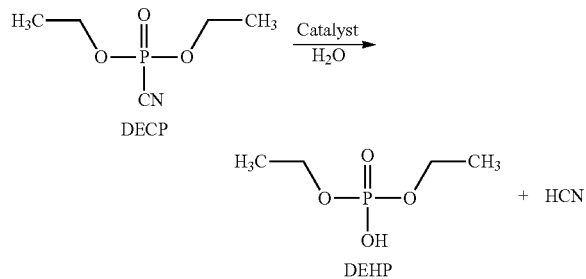

The conversion and selectivity for the oxidation of CEES and the hydrolysis of DECP catalyzed by the described catalysts, were analyzed and confirmed by gas chromatography (GC) at room temperature.

Advantageous Effects of the Present Invention (1) The catalysts of this invention as multifunctional catalysts can rapidly and high-selectively catalyze the degradation of CEES and DECP. Within 5 min, CEES was high-selectively oxidized to the corresponding nontoxic 2-chloroethyl ethyl sulfoxide (CEESO) (conv. %=99%, sele. %>99.9%). Within 10 min, DECP can be almost entirely decomposed (conv. %=99.0%).

(2) The catalysts of this invention have the advantage of recyclability. In the catalytic degradation of CEES, these compounds as heterogeneous catalysts, were collected by simple filtration after the catalytic reaction. The conversion and selectivity of CEES remain stable after the following cycles using the collected catalysts. In the catalytic degradation of DECP, when the catalytic reaction was finished, the reusability was tested by adding the same amount of DECP under similar condition. The catalytic effect remained stable for the following cycles.

(3) The metal ion-directed carboxylic acid functionalized polyoxometalate hybrid compounds of this invention were synthesized by the conventional aqueous solution reaction strategy, which is safe and simple. The raw materials of this reaction system are very cheap, and the yield can be reached to 62%.

(4) The structures of these metal ion-directed carboxylic acid functionalized polyoxometalate hybrid compounds of this invention are novel, and represent the first extended architectures constructed from two different organic ligands modified polyoxometalates and metal cations.

DETAILED DESCRIPTION OF THE INVENTION

Figure 1:
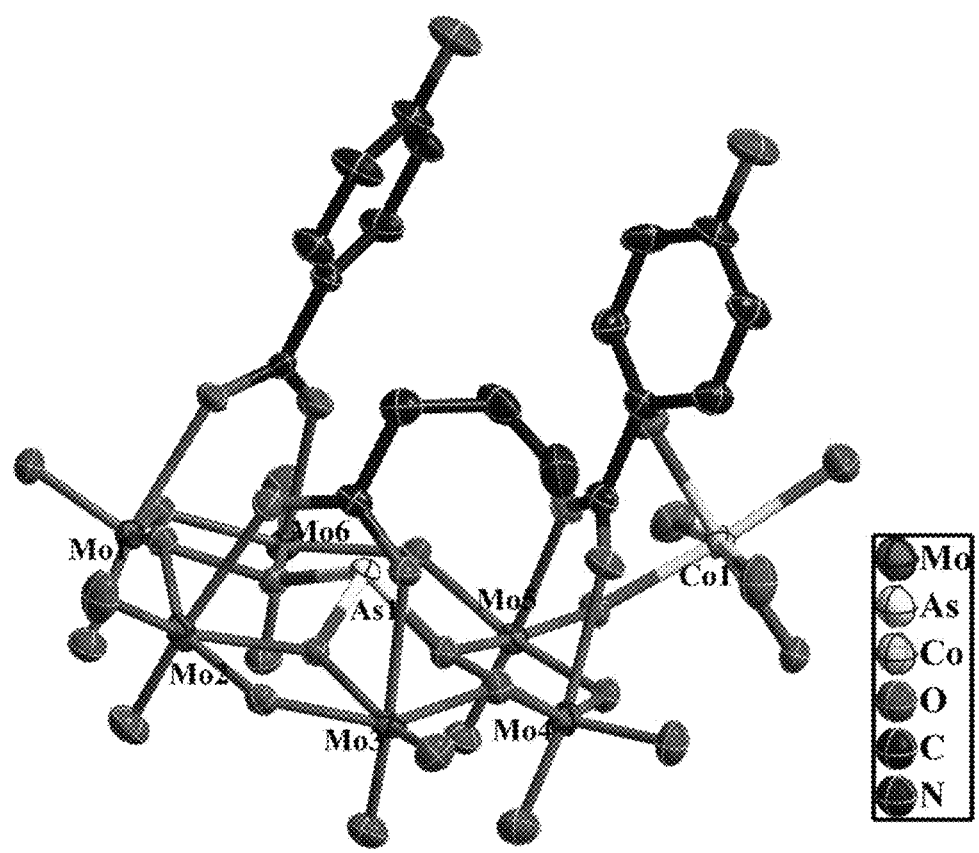
FIG. 1 shows the asymmetric unit of compound 1 in the present invention.

This invention is further illustrated by the following detailed description of some embodiments, which only explain the invention, but not limit this invention.

Example 1

The preparation method of the metal ion-directed carboxylic acid functionalized polyoxometalate hybrid compounds is as follows:

0.145 g Na$_2$MoO$_4$, 0.0197 g As$_2$O$_3$, 0.0224 g KCl, 0.0089 g Ala, and 0.0274 g PHBA, were dissolved in 20 mL water. The pH value of the mixture was adjusted to 3.5 by HCl and the solution was stirred for 1 h at room temperature. Then, 0.0714 g $CoCl_2$ was added to the reaction system. Finally, the solution was heated and stirred for 1 h at 80° C. The filtrate was kept undisturbed after it cooled under ambient conditions until the crystals produced.

The described 0.0714 g $CoCl_2$ can be replaced by 0.0678 g $NiCl_2$ or 0.0861 g $ZnCl_2$ or 0.0486 g $MnCl_2$.

Example 2

The preparation method of the metal ion-directed carboxylic acid functionalized polyoxometalate hybrid compounds is as follows:

0.145 g $Na_2MoO_4$, 0.0197 g $As_2O_3$, 0.0224 g KCl, 0.0089 g Ala, and 0.0274 g PHBA, were dissolved in 20 mL water. The pH value of the mixture was adjusted to 3.5 by HCl and the solution was stirred for 1 h at room temperature. Then, 0.0873 g $Ni(NO_3)_2$ was added to the reaction system. Finally, the solution was heated and stirred for 1 h at 80° C. The filtrate was kept undisturbed after it cooled under ambient conditions until the crystals produced.

Example 3

The preparation method of the metal ion-directed carboxylic acid functionalized polyoxometalate hybrid compounds is as follows:

0.145 g $Na_2MoO_4$, 0.0197 g $As_2O_3$, 0.0224 g KCl, 0.0089 g Ala, and 0.0274 g PHBA, were dissolved in 20 mL water. The pH value of the mixture was adjusted to 3.5 by HCl and the solution was stirred for 1 h at room temperature. Then, 0.0893 g $Zn(NO_3)_2$ was added to the reaction system. Finally, the solution was heated and stirred for 1 h at 80° C. The filtrate was kept undisturbed after it cooled under ambient conditions until the crystals produced.

Example 4

The preparation method of the metal ion-directed carboxylic acid functionalized polyoxometalate hybrid compounds is as follows:

0.145 g $Na_2MoO_4$, 0.0197 g $As_2O_3$, 0.0149 g KCl, 0.0089 g Ala, and 0.0274 g PHBA, were dissolved in 20 mL water. The pH value of the mixture was adjusted to 3.5 by HCl and the solution was stirred for 1 h at room temperature. Then, 0.0843 g $CoSO_4$ was added to the reaction system. Finally, the solution was heated and stirred for 1 h at 80° C. The filtrate was kept undisturbed after it cooled under ambient conditions until the crystals produced.

Example 5

The preparation method of the metal ion-directed carboxylic acid functionalized polyoxometalate hybrid compounds is as follows:

0.145 g $Na_2MoO_4$, 0.0197 g $As_2O_3$, 0.0149 g KCl, 0.0089 g Ala, and 0.0274 g PHBA, were dissolved in 20 mL water. The pH value of the mixture was adjusted to 3.5 by HCl and the solution was stirred for 1 h at room temperature. Then 0.0788 g $NiSO_4$ was added to the reaction system. Finally, the solution was heated and stirred for 1 h at 80° C. The filtrate was kept undisturbed after it cooled under ambient conditions until the crystals produced.

Example 6

The preparation method of the metal ion-directed carboxylic acid functionalized polyoxometalate hybrid compounds is as follows:

0.145 g $Na_2MoO_4$, 0.0197 g $As_2O_3$, 0.0149 g KCl, 0.0089 g Ala, and 0.0274 g PHBA, were dissolved in 20 mL water. The pH value of the mixture was adjusted to 3.5 by HCl and the solution was stirred for 1 h at room temperature. Then, 0.0863 g $ZnSO_4$ was added to the reaction system. Finally, the solution was heated and stirred for 1 h at 80° C. The filtrate was kept undisturbed after it cooled under ambient conditions until the crystals produced.

Example 7

The preparation method of the metal ion-directed carboxylic acid functionalized polyoxometalate hybrid compounds is as follows:

0.145 g $Na_2MoO_4$, 0.0197 g $As_2O_3$, 0.0149 g KCl, 0.0089 g Ala, and 0.0274 g PHBA, were dissolved in 20 mL water. The pH value of the mixture was adjusted to 3.5 by HCl and the solution was stirred for 1 h at room temperature. Then, 0.0669 g $MnSO_4$ was added to the reaction system. Finally, the solution was heated and stirred for 1 h at 80° C. The filtrate was kept undisturbed after it cooled under ambient conditions until the crystals produced.

Example 8

The preparation method of the metal ion-directed carboxylic acid functionalized polyoxometalate hybrid compounds is as follows:

0.145 g $Na_2MoO_4$, 0.0197 g $As_2O_3$, 0.0224 g KCl, 0.0089 g Ala, and 0.0274 g PHBA, were dissolved in 20 mL water. The pH value of the mixture was adjusted to 4.2 by HCl and the solution was stirred for 1 h at room temperature. Then, 0.0714 g $CoCl_2$ was added to the reaction system. Finally, the solution was heated and stirred for 1 h at 80° C. The filtrate was kept undisturbed after it cooled under ambient conditions until the crystals produced.

The described 0.0714 g $CoCl_2$ can be replaced by 0.0678 g $NiCl_2$ or 0.0861 g $ZnCl_2$ or 0.0486 g $MnCl_2$.

Example 9

The preparation method of the metal ion-directed carboxylic acid functionalized polyoxometalate hybrid compounds is as follows:

0.145 g $Na_2MoO_4$, 0.0197 g $As_2O_3$, 0.0224 g KCl, 0.0089 g Ala, and 0.0274 g PHBA, were dissolved in 20 mL water. The pH value of the mixture was adjusted to 3.5 by HCl and the solution was stirred for 1 h at room temperature. Then, 0.0476 g $CoCl_2$ was added to the reaction system. Finally, the solution was heated and stirred for 1 h at 80° C. The filtrate was kept undisturbed after it cooled under ambient conditions until the crystals produced.

The described 0.0476 g $CoCl_2$ can be replaced by 0.0452 g $NiCl_2$ or 0.0574 g $ZnCl_2$ or 0.0324 g $MnCl_2$.

Figure 2:
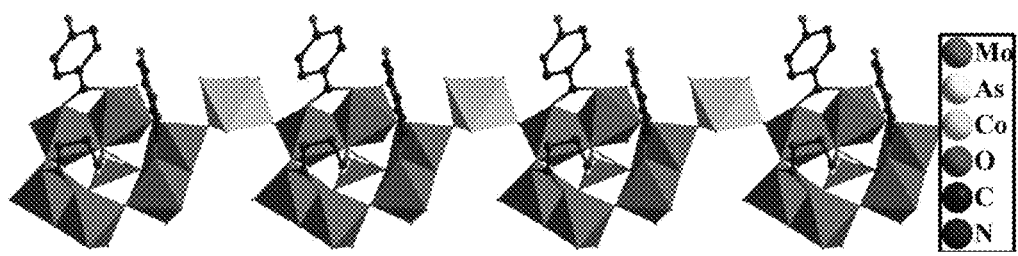
FIG. 2 shows the 1D chain structure of compound 1 in the present invention.
Figure 3:
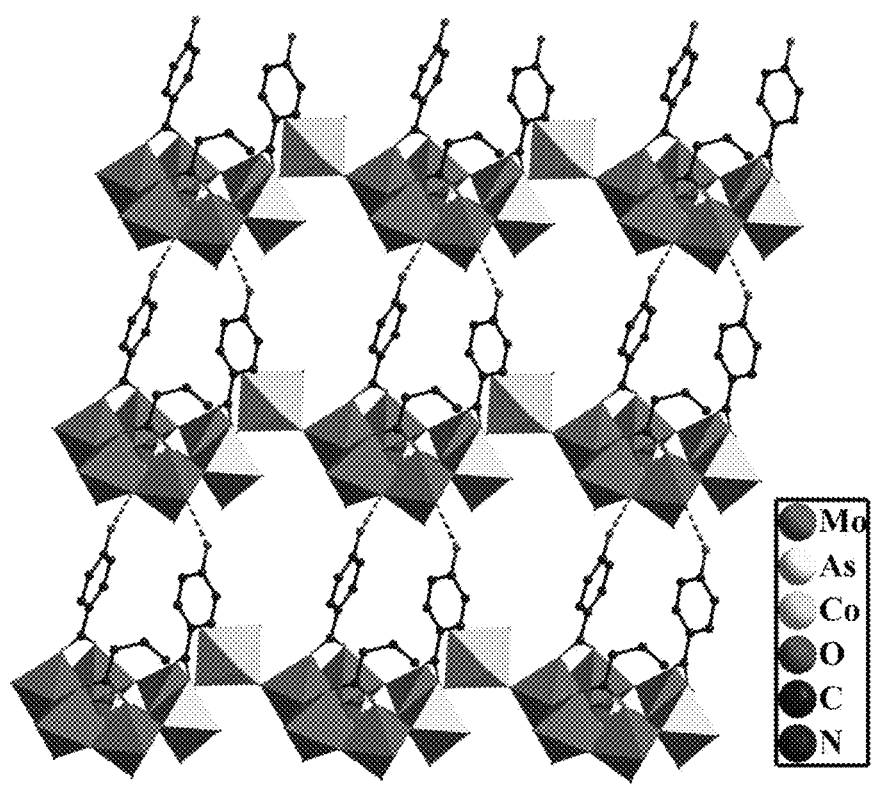
FIG. 3 shows the 2D supramolecular sheet of compound 1 in the present invention.

The products of the above embodiments were tested. The chemical formulas of these compounds are $K_2H[(H_2O)_4M][AsMo_6O_{21}(Ala)(PHBA)_2] \cdot nH_2O$ 1-4 (M=$Co^{2+}$1, $Ni^{2+}$2, $Zn^{2+}$3, $Mn^{2+}$4; n=6.5, 9, 7.5, 7.5; Ala=alanine, PHBA=p-hydroxybenzonic acid). The crystal structues of these compounds are displayed in FIGS. 1, 2 and 3.

Figure 4:
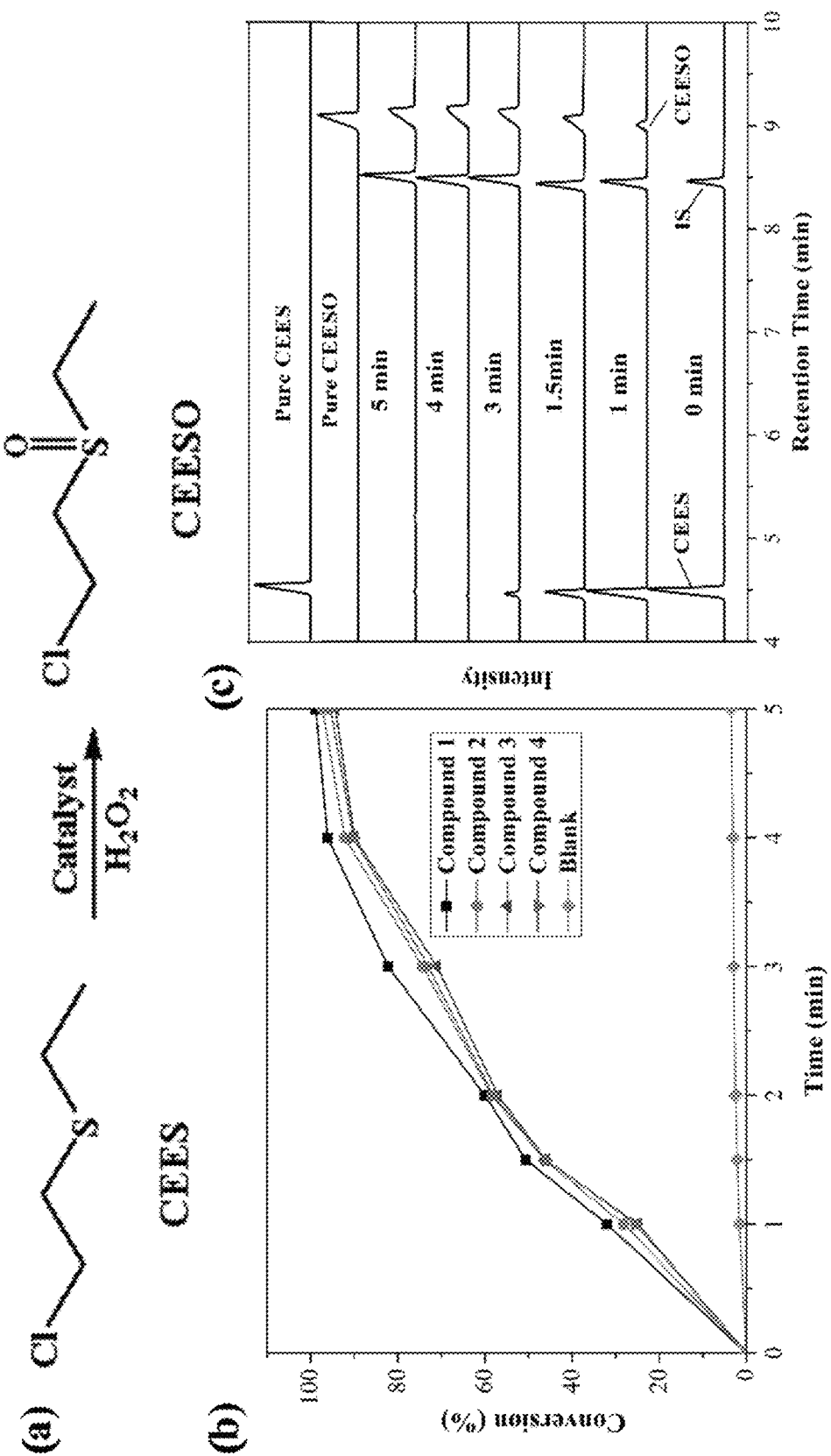
FIG. 4 shows the results for the oxidation of CEES catalyzed by compounds described in example 1, a) time profile of conversion of CEES oxidation catalyzed by compounds 1-4; b) GC-FID signals for the oxidation progress of CEES catalyzed by compound 1.

The catalytic results of compounds described in example 1 were confirmed by GC. FIG. 4a displayed the time profiles of the conversion of CEES oxidation, which indicated that CEES can be almost entirely converted to CEESO within 5 min. FIG. 4b further illustrated CEES was almost completely oxidized to the only product CEESO within 5 min through the comparisons of GC signals of different substances at different time.

Figure 5:
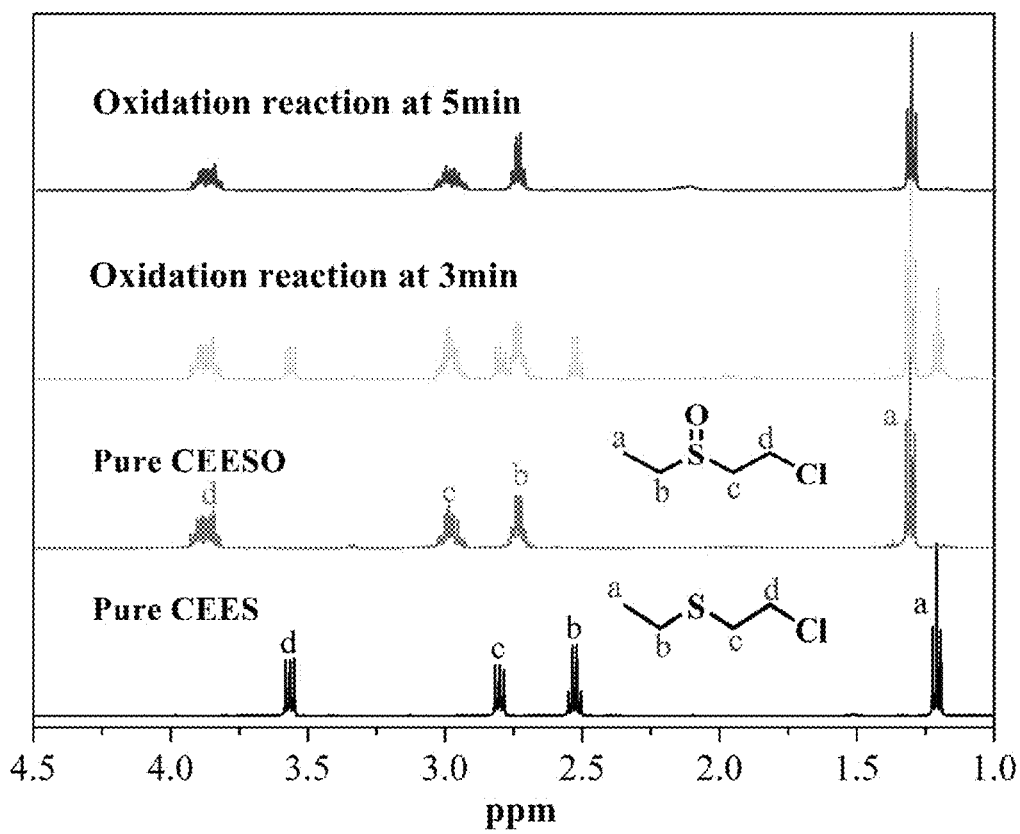
FIG. 5 shows $^1$H NMR spectra for the oxidation process of CEES catalyzed by compound 1 in example 1.
Figure 6:
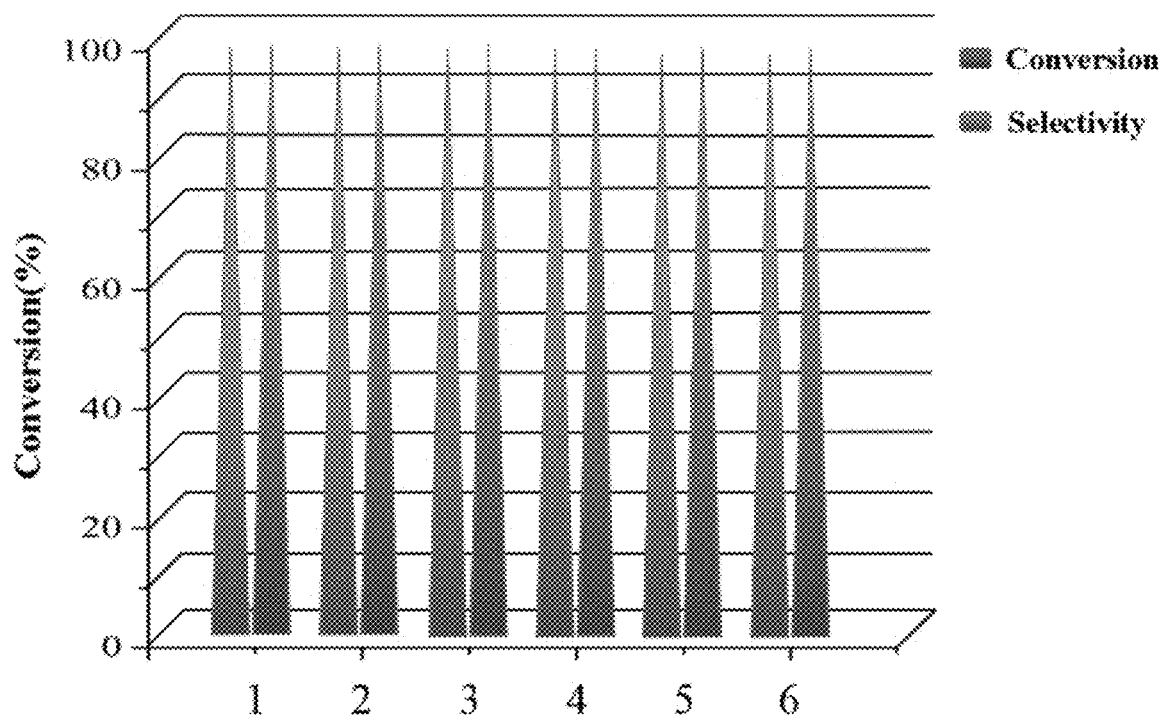
FIG. 6 shows the recycling of conversion and selectivity for the oxidation of CEES catalyzed by compound 1 in example 1.

$^1$HNMR spectroscopy was also utilized to monitor the conversion and ascertain the product to demonstrate the accuracy of the reaction. The comparison of $^1$HNMR spectroscopy at different reaction time indicated nearly entire CEES was degraded by compound 1 described in example 1 within 5 min in FIG. 5.

Figure 7:
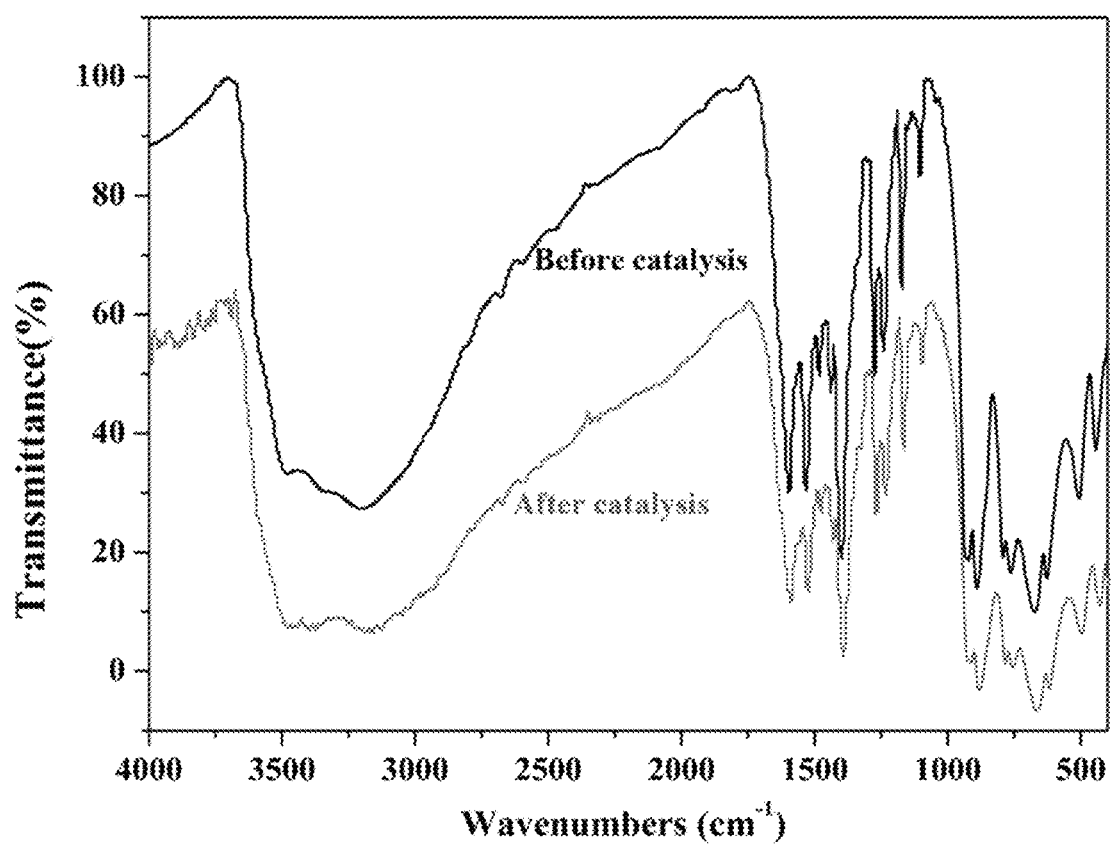
FIG. 7 shows a FT-IR spectra comparison plot of compound 1 in example 1 before and after the catalytic reaction.

The stability of compounds described in example 1 before and after the catalytic reaction was proved by the IR spectra. FIG. 7 displayed the IR spectra comparison of the compound in the present invention before and after the catalytic reaction. The characteristic peaks showed no obvious changes, indicating the structure of compound keeps intact as the heterogeneous catalyst before and after the catalytic reaction.

Figure 8:
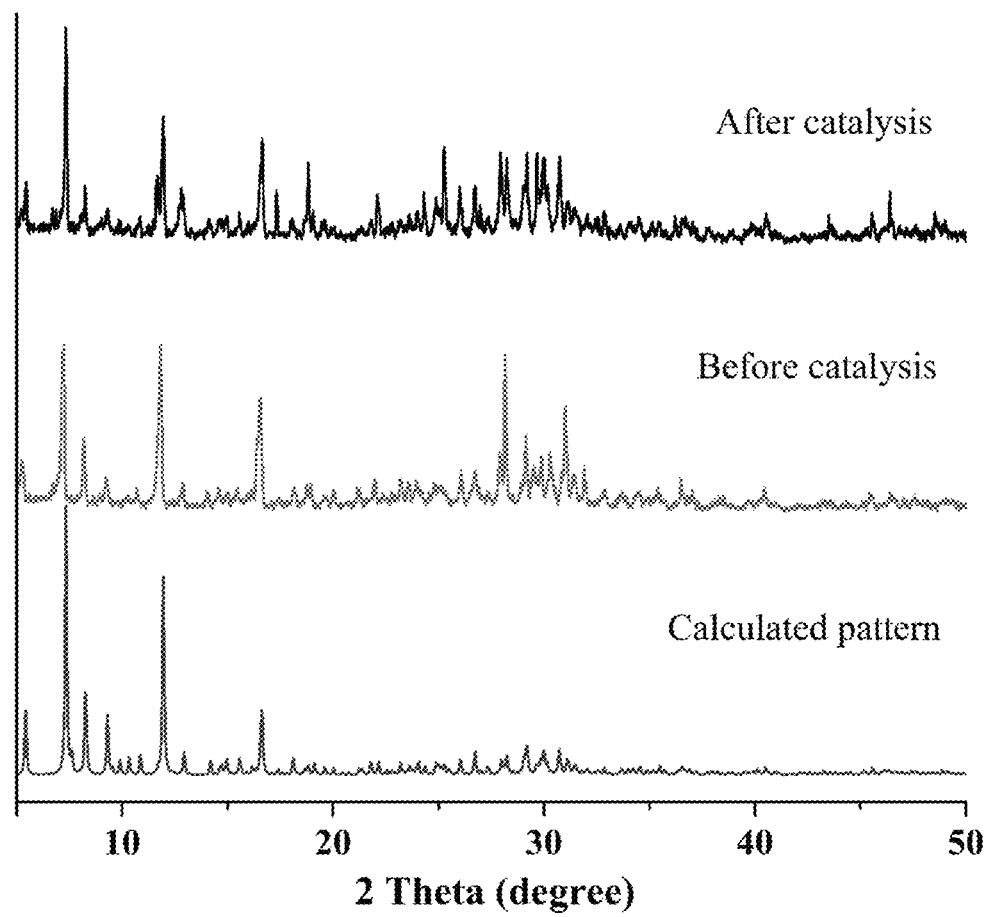
FIG. 8 shows a comparison plot of powder X-ray diffraction (PXRD) patterns of compound 1 in example 1 before and after the catalytic reaction.
Figure 9:
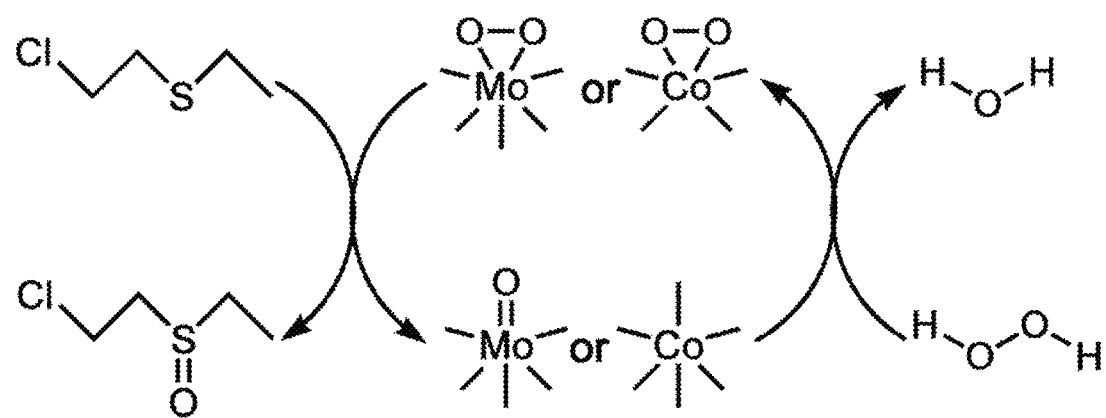
FIG. 9 shows the proposed mechanism of the catalytic oxidation of CEES catalyzed by compound 1 in example 1.

The stability of compounds described in example 1 was also proved by the XRD patterns of before and after the catalytic reaction. FIG. 8 displayed the comparison of simulated and experimental XRD pattern of the compound in the present invention before and after the catalytic reaction. The results indicate the structure of compound keeps intact as the heterogeneous catalyst.

Figure 10:
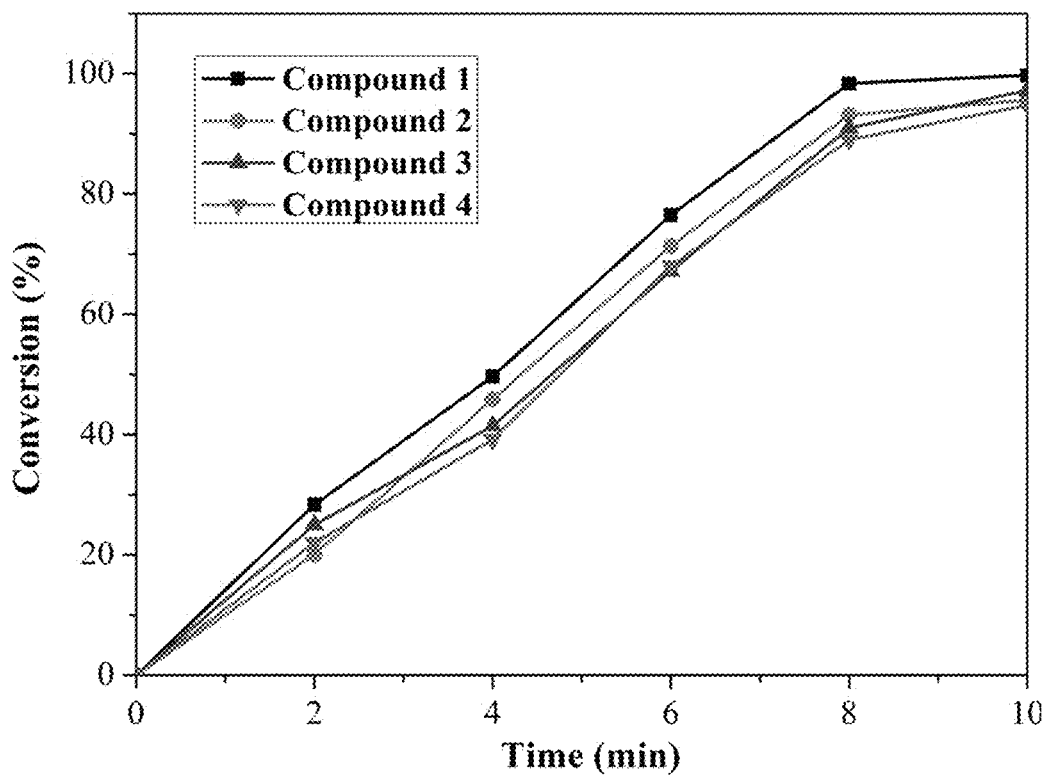
FIG. 10 shows the result for the hydrolysis of DECP catalyzed by compound 1 in example 1.
Figure 11:
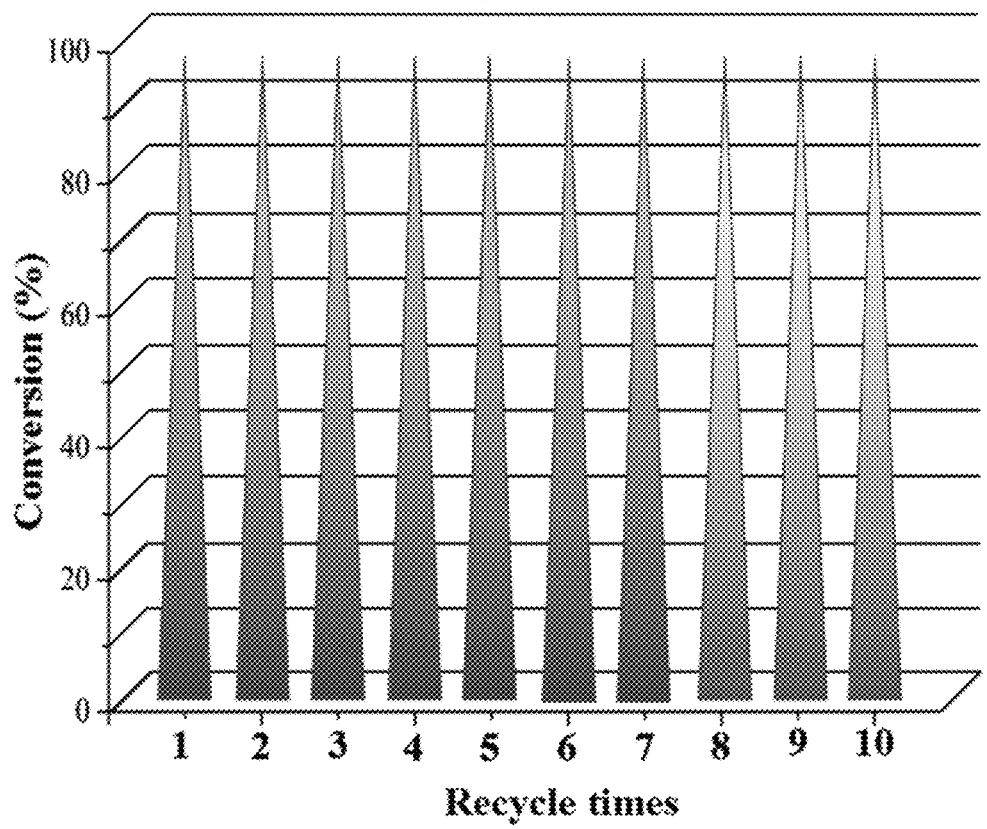
FIG. 11 shows the recycle test for the hydrolytic degradation of DECP by compound 1 in example 1.

The catalytic result for compounds described in example 1 was detected by GC. FIG. 10 displayed the time profiles of the conversion of DECP hydrolysis, which indicated that DECP was almost completely converted to the corresponding products within 10 min.

TABLE 1

Comparison of CEES decomposition by different materials in recent years

| catalyst | Time (min) | Oxidant | Temperature (° C.) | Conversion (%) | Sulfoxide selectivity (%) |
|---|---|---|---|---|---|
| Compound 1 | 5 | $H_2O_2$ | 25 | 98.5 | >99.9% |
| Compound 2 | 5 | $H_2O_2$ | 25 | 97.3 | >99.9% |
| Compound 3 | 5 | $H_2O_2$ | 25 | 95.4 | >99.9% |
| Compound 4 | 5 | $H_2O_2$ | 25 | 94.3 | >99.9% |
| $PNb_{12}V^V V^{IV}_4$ | 60 | $H_2O_2$ | 25 | 100 | 67 |
| $PW_{12}$@NU-1000 | 20 | $H_2O_2$ | 45 | 98 | 57 |
| TBA-poly$V_6$ | 30 | $H_2O_2$ | 25 | 99 | 100 |
| fb-PCN-222/MOF-545 | 60 | $O_2$ | 25 | 93 | 100 |

TABLE 2

Comparison of DECP decomposition by different materials in recent years.

| Catalyst | Time (min) | Conversion (%) | $t_{1/2}$ (min) |
|---|---|---|---|
| Compound 1 | 10 | 99 | 3.8 |
| Compound 2 | 10 | 97 | 4.2 |
| Compound 3 | 10 | 95 | 4.7 |
| Compound 4 | 10 | 96 | 4.8 |
| MOF-808 | 30 | 50 | 24 |
| UiO-66 | 30 | 32 | 78 |
| MgO | 30 | 90 | 12 |
| $TiO_2$ | 30 | 87 | 12 |
| KGeNb | 30 | 100 | 6 |
| $PNb_{12}V^V V^{IV}_4$ | 30 | 98 | 10 |
| $K_8Nb_6O_{19}$ | 30 | 90 | 12 |

The invention claimed is:

1. Metal ion-directed carboxylic acid functionalized polyoxometalate hybrid compounds, wherein the compounds are composed of carboxylic acid modified polyoxomolybdate $[AsMo_6O_{21}(Ala)(PHBA)_2]^{5-}$ covalently linked by metal cations selected from ($Co^{2+}$, $Ni^{2+}$, $Zn^{2+}$, or $Mn^{2+}$) to form 1-dimensional (1D) chain structures; a chemical formula is $K_2H[(H_2O)_4M][AsMo_6O_{21}(Ala)(PHBA)_2]\cdot nH_2O$; wherein M=$Co^{2+}$, $Ni^{2+}$, $Zn^{2+}$, $Mn^{2+}$; Ala=alanine, PHBA=p-hydroxybenzoic acid; n=6.5, 9, 7.5, 7.5, a value of n corresponds to M=$Co^{2+}$, $Ni^{2+}$, $Zn^{2+}$, $Mn^{2+}$, respectively;

crystals of the metal ion-directed carboxylic acid functionalized polyoxometalate hybrid compounds belong to triclinic crystal system and P-1 space group;

when M=$Co^{2+}$, cell parameters of compound 1 are a=12.0872(8) Å, b=12.5682(8) Å, c=17.2255(13) Å, α=76.700(4)°, β=74.058(4)°, γ=76.399(4)°;

when M=$Ni^{2+}$, cell parameters of compound 2 are a=11.9612(4) Å, b=12.5318(3) Å, c=17.1943(4) Å, α=76.4990(10) °, β=74.053(2)°, γ=76.535(2)°;

when M=$Zn^{2+}$, cell parameters of compound 3 are a=12.1425(2) Å, b=12.5739(2)Å, c=17.2226(3)Å, α=76.4430(10) °, β=74.0620(10)°, γ=76.2250(10)°;

when M=$Mn^{2+}$, cell parameters of compound 4 are a=12.2865(7) Å, b=12.6065(7) Å, c=17.2145(11) Å, α=76.319(3) °, β=73.933(3)°, γ=76.064(3)°;

compounds 1-4 are isostructural, and an asymmetric unit of compounds 1-4 contains one crystallographically independent $[AsMo_6O_{21}]^{3-}$ anion, one $Co^{2+}$, $Ni^{2+}$, $Zn^{2+}$ or $Mn^{2+}$ cation, two $K^+$ cations, two p-hydroxybenzoic acids and one protonated alanine molecule; firstly, the $[AsMo_6O_{21}(Ala)(PHBA)_2]^{5-}$ units are joined together by $Co^{2+}$ via Co—O—Mo bond, $Ni^{2+}$ via Ni—O—Mo bond, $Zn^{2+}$ via Zn—O—Mo bond and $Mn^{2+}$ via Mn—O—Mo bond, respectively, to form a 1D linear chain; then strong hydrogen bonds between 1D chains produce a 2-dimensional (2D) supramolecular layer; finally, these 2D layers are linked together to generate a 3-dimensional (3D) supramolecular framework via the hydrogen bonds.

2. A preparation method of the metal ion-directed carboxylic acid functionalized polyoxometalate hybrid compounds according to claim 1 is as follows:

firstly, $Na_2MoO_4$, PHBA, Ala, KCl and $As_2O_3$ were dissolved in water, and a pH value of a mixture was adjusted to 3.5-4.5 with 4 M HCl; then an excessive amount of $CoCl_2$ was added to the reaction mixture; a mole ratio of these materials $Na_2MoO_4$, PHBA, Ala, KCl, $As_2O_3$ and $CoCl_2$ are 6:2:1:2-3:1:1-3; finally, the mixture was heated and stirred in water bath for 1-5 hours at 75-100° C.; a filtrate was kept undisturbed after it cooled under ambient conditions until crystals produced; the crystals are the metal ion-directed carboxylic acid functionalized polyoxometalate hybrid compounds, which were then washed and dried.

3. The preparation method according to claim 2, wherein $CoCl_2$ is replaced by $NiCl_2$, $ZnCl_2$, or $MnCl_2$.

4. The preparation method according to claim 2, wherein $CoCl_2$ is replaced by $Co(NO_3)_2$ or $CoSO_4$.

5. An application of the metal ion-directed carboxylic acid functionalized polyoxometalate hybrid compounds according to claim 1 in catalyzing the degradation of 2-chloroethyl ethyl sulfide (CEES), wherein the operation is as follows:

CEES and the metal ion-directed carboxylic acid modified polyoxometalates were mixed together in anhydrous ethanol; then, $H_2O_2$ was subsequently added in this reaction system under stirring; the catalytic degradation was finished after 5 minutes; mole ratio of CEES, the metal ion-directed carboxylic acid modified polyoxometalates and oxidant is 200:3:200-300; the catalytic degradation route is as follow:

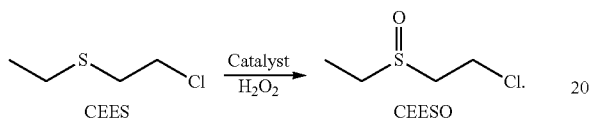

6. An application of the metal ion-directed carboxylic acid modified polyoxometalate hybrid compounds according to claim 1 in catalyzing the degradation of diethyl cyanophosphonate (DECP), wherein the operation is as follows:

DECP, N N-dimethylformamide (DMF) and $H_2O$ were mixed together under stirring, and then the metal ion-directed carboxylic acid functionalized polyoxometalate hybrid compounds were subsequently added into the catalytic mixture; the catalytic degradation was completed after 10 minutes; a mole ratio of DECP and catalyst is 1000:1; the catalytic degradation route is as follow:

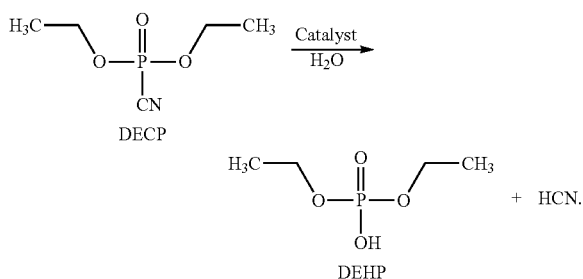

* * * * *